(12) United States Patent
Leone et al.

(10) Patent No.: US 9,518,506 B2
(45) Date of Patent: Dec. 13, 2016

(54) SYSTEMS AND METHODS FOR CONTROL OF TURBINE-GENERATOR VIA VALVE DEACTIVATION IN A SPLIT EXHAUST ENGINE SYSTEM

(71) Applicant: Ford Global Technologies, LLC, Dearborn, MI (US)

(72) Inventors: Thomas G. Leone, Ypsilanti, MI (US); Joseph Norman Ulrey, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 75 days.

(21) Appl. No.: 14/537,697

(22) Filed: Nov. 10, 2014

(65) Prior Publication Data
US 2016/0131046 A1    May 12, 2016

(51) Int. Cl.
  F02D 23/00    (2006.01)
  F02B 33/44    (2006.01)
  F01L 1/34     (2006.01)
  F01L 1/18     (2006.01)
  F02B 37/00    (2006.01)
  F02F 1/42     (2006.01)
  (Continued)

(52) U.S. Cl.
  CPC ........... F02B 37/004 (2013.01); F01L 1/28 (2013.01); F01L 1/285 (2013.01); F01N 5/04 (2013.01); F02D 13/0257 (2013.01); F02D 41/021 (2013.01); F02F 1/4214 (2013.01); F02D 13/0242 (2013.01); F02D 41/008 (2013.01); F02D 41/024 (2013.01); F02D 2041/001 (2013.01)

(58) Field of Classification Search
  CPC ............ F02D 13/0249; F02D 2041/001; F02D 2041/0012; F02D 13/0261; F02B 37/004; F02F 1/4214; F01L 1/28; F01L 1/285
  USPC ....... 60/602, 608, 614, 624; 123/90.15, 90.4
  See application file for complete search history.

(56) References Cited

U.S. PATENT DOCUMENTS 3,559,397 A    2/1971  Navarro
5,417,068 A *  5/1995  Olofsson ................. F02B 37/18
                                                           60/602

(Continued)

FOREIGN PATENT DOCUMENTS

DE    WO 0136797 A1 *  5/2001  ............ F02F 1/4214
FR       2860834 A1 *  4/2005  ............ F02B 37/02

(Continued)

OTHER PUBLICATIONS

Möller, Christel Elmqvist et al., "Divided Exhaust Period—A Gas Engine System for Turbocharged SI Engines," SAE Technical Paper Series No. 2005-01-1150, 2005 SAE World Congress, Detroit, MI., Apr. 11-14, 2005, 15 pages.

(Continued)

*Primary Examiner* — Thai Ba Trieu
(74) *Attorney, Agent, or Firm* — Julia Voutyras; Alleman Hall McCoy Russell & Tuttle LLP

(57) ABSTRACT

Methods and systems are provided for reducing exhaust energy delivered to a turbine of a turbine-generator coupled to a split exhaust engine system in order to reduce turbine over-speed conditions and/or to reduce a generator output. In one example, a method may include deactivating a blow-down exhaust valve utilized to deliver a blowdown portion of exhaust energy to the turbine.

20 Claims, 7 Drawing Sheets

(51) Int. Cl.
*F01L 1/28* (2006.01)
*F02D 41/02* (2006.01)
*F01N 5/04* (2006.01)
*F02D 41/00* (2006.01)
*F02D 13/02* (2006.01)

(56) References Cited

U.S. PATENT DOCUMENTS

| | | | |
|---|---|---|---|
| 5,857,336 A * | 1/1999 | Paul | F02B 37/00 60/597 |
| 6,169,332 B1 | 1/2001 | Taylor et al. | |
| 6,460,337 B1 | 10/2002 | Olofsson | |
| 6,553,977 B2 | 4/2003 | Schmitz | |
| 6,595,183 B1 | 7/2003 | Olofsson | |
| 6,715,289 B2 | 4/2004 | Mader et al. | |
| 7,044,885 B2 | 5/2006 | Doering | |
| 7,260,467 B2 | 8/2007 | Megli et al. | |
| 7,587,898 B2 * | 9/2009 | Turner | F02D 13/0257 60/612 |
| 8,065,878 B2 * | 11/2011 | Vuk | F02D 13/0249 60/612 |
| 8,069,663 B2 | 12/2011 | Ulrey et al. | |
| 8,091,357 B2 | 1/2012 | Robel | |
| 8,272,362 B2 | 9/2012 | Shane et al. | |
| 8,364,378 B2 | 1/2013 | De Graaff et al. | |
| 8,479,511 B2 | 7/2013 | Pursifull et al. | |
| 8,511,084 B2 | 8/2013 | Ulrey et al. | |
| 8,539,770 B2 | 9/2013 | Williams | |
| 8,555,636 B2 * | 10/2013 | Schwarzenthal | F02B 37/18 60/614 |
| 8,601,811 B2 | 12/2013 | Pursifull et al. | |
| 8,671,898 B2 | 3/2014 | Brandt et al. | |
| 8,701,409 B2 | 4/2014 | Pursifull et al. | |
| 8,713,937 B2 | 5/2014 | Pursifull et al. | |
| 8,739,527 B2 | 6/2014 | Ulrey et al. | |
| 8,931,273 B2 | 1/2015 | Rollinger et al. | |
| 9,080,523 B1 * | 7/2015 | Ulrey | F02D 13/0242 60/602 |
| 2008/0185194 A1 | 8/2008 | Leone | |
| 2010/0263639 A1 | 10/2010 | Uhrich et al. | |
| 2011/0219767 A1 | 9/2011 | Miyashita | |
| 2013/0305709 A1 | 11/2013 | Rollinger et al. | |
| 2013/0305714 A1 | 11/2013 | Rollinger et al. | |
| 2013/0305715 A1 | 11/2013 | Rollinger et al. | |
| 2013/0305716 A1 | 11/2013 | Rollinger et al. | |
| 2014/0053551 A1 | 2/2014 | Pursifull et al. | |
| 2015/0176481 A1 * | 6/2015 | Jaeger | F02B 39/10 60/608 |
| 2015/0316005 A1 * | 11/2015 | Madison | F02D 41/0065 60/602 |

FOREIGN PATENT DOCUMENTS

| | | | | |
|---|---|---|---|---|
| GB | 2423797 A | * | 9/2006 | F02B 33/34 |
| JP | 61210224 A | * | 9/1986 | |
| JP | 63009616 A | * | 1/1988 | |
| JP | 10089106 A | * | 4/1998 | |

OTHER PUBLICATIONS

Roth, David et al., "Valve-Event Modulated Boost System," SAE Technical Paper Series No. 2010-01-1222, published Apr. 12, 2010, 16 pages.

Roth, David et al., "Valve-Event Modulated Boost System: Fuel Consumption and Performance with Scavenge-Sourced EGR," SAE Technical Paper Series No. 2012-01-0705, published Apr. 16, 2012, 9 pages.

Hu, Bo et al., "1-D Simulation Study of Divided Exhaust Period for a Highly Downsized Turbocharged SI Engine-Scavenge Valve Optimization," SAE Technical Paper Series No. 2014-01-1656, published Apr. 1, 2014, 10 pages.

Haughton, Andrew et al., "Development of an Exhaust Driven Turbine-Generator Integrated Gas Energy Recovery System (Tigers®)," SAE Technical Paper Series No. 2014-01-1873, published Apr. 1, 2014, 8 pages.

Ulrey, Joseph N. et al., "Systems and Metonds for Control of Turbine-Generator via Exhaust Valve Timing and Duration in a Split Engine System," U.S. Appl. No. 14/537,722, filed Nov. 10, 2014, 58 pages.

Glugla, Chris P., "Method for Pre-Ignition Control in a Pre-Delivery Phase," U.S. Appl. No. 14/550,611, filed Nov. 21, 2014, 62 pages.

* cited by examiner

SYSTEMS AND METHODS FOR CONTROL OF TURBINE-GENERATOR VIA VALVE DEACTIVATION IN A SPLIT EXHAUST ENGINE SYSTEM

FIELD

The present description relates generally to methods and systems for controlling a vehicle engine including a split exhaust manifold to adjust a turbine-generator speed coupled to the split-exhaust manifold via valve deactivation.

BACKGROUND/SUMMARY

In engine systems with split exhaust manifold, a blowdown exhaust valve of a cylinder may be opened first to deliver exhaust mass flow from an initial portion of an exhaust phase to a turbine of a turbocharger or a turbine-driven generator, while a scavenging valve may be opened later to deliver exhaust mass flow from a latter portion of the exhaust phase directly to an exhaust catalyst, bypassing the turbine. In this way, by directing exhaust gases away from the turbine during the latter portion of the exhaust phase, pumping penalty associated with high turbine backpressure may be reduced.

One example of such a split exhaust engine system is illustrated by Robel in U.S. Pat. No. 8,091,357. Therein, an exhaust system includes a turbo compounding device located in a first exhaust branch, and an exhaust gas treatment device is located in a second exhaust branch. Further, a valve is interposed between the first exhaust branch and the second exhaust branch, which when opened directs exhaust gases away from the turbo compounding device to the exhaust gas treatment device.

However, the inventors herein have recognized potential issues with such a system. As one example, during some operating conditions, it may be desirable to bypass exhaust gas flow around the turbine in order to limit a maximum speed for the turbine-generator; limit an output of the generator; and/or limit a rate of change of a speed of the generator. Further, during cold-start conditions, it may be desirable to bypass the turbine in order to direct a majority of exhaust energy to the exhaust catalyst to expedite catalyst warm-up. Utilizing a valve to bypass the turbine necessitates need for an additional actuator. Consequently, production cost and packaging space may increase resulting in bulky and expensive exhaust systems.

Thus in one example, some of these issues may be at least partly addressed by a method for an engine, comprising: delivering exhaust from a first exhaust valve of a cylinder to an exhaust turbine via a first exhaust manifold, the turbine driving a generator; delivering exhaust from a second exhaust valve of the cylinder to an exhaust catalyst while bypassing the turbine via a second exhaust manifold; and selectively deactivating the first exhaust valve in response to a turbine speed greater than a threshold turbine speed. In this way, by utilizing valve deactivation, an amount of exhaust mass flow to the turbine may be reduced.

For example, a split exhaust engine system may include a first exhaust valve (herein referred to as blowdown valve) for delivering a first portion of exhaust energy (herein referred to as blowdown energy) to a turbine of a turbine-generator located in a first exhaust passage. The engine system may further include a second exhaust valve (herein referred to as scavenging valve) for delivering a latter portion of exhaust energy (herein referred to as scavenging energy) to an exhaust catalyst located in a second, different exhaust passage. During engine operating conditions when a turbine speed of the turbine-generator is greater than a threshold speed or when a generator output is greater than a desired output, an engine controller may reduce an amount of exhaust gas (that is, blowdown gas) delivered to the turbine by deactivating the blowdown valves in a number of cylinders in the engine system. The number of blowdown valves that may be deactivated may be based on one or more of a rate of change of turbine speed, a difference between an actual generator output and a desired generator output greater than a threshold difference, and an engine speed/load condition. In some examples, the blowdown valves on all cylinders of the engine may be deactivated to limit exhaust flow to the turbine.

In one example, during cold start conditions, exhaust energy to the turbine may be limited via blowdown valve deactivation in order to direct a majority of exhaust gases to an exhaust catalyst located downstream of the turbine-generator for faster catalyst warm-up.

In this way, one or more blowdown valves may be deactivated to reduce the amount of exhaust energy delivered to the turbine to limit the maximum speed of the turbine-generator system, limit the output of the generator, limit the rate of change of the turbine-driven generator speed, and/or to expedite catalyst warm-up. By utilizing valve deactivation, a wastegate valve for controlling exhaust flow to the turbine may be avoided. Further, by utilizing valve deactivation instead of the wastegate, a bulky, expensive actuator for actuating the wastegate may be avoided. Consequently, system cost and packaging may be reduced. Still further, by avoiding the wastegate, a volume upstream of the turbine may be reduced. Consequently, utilization of blowdown energy may be improved, thereby increasing the turbine-generator efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
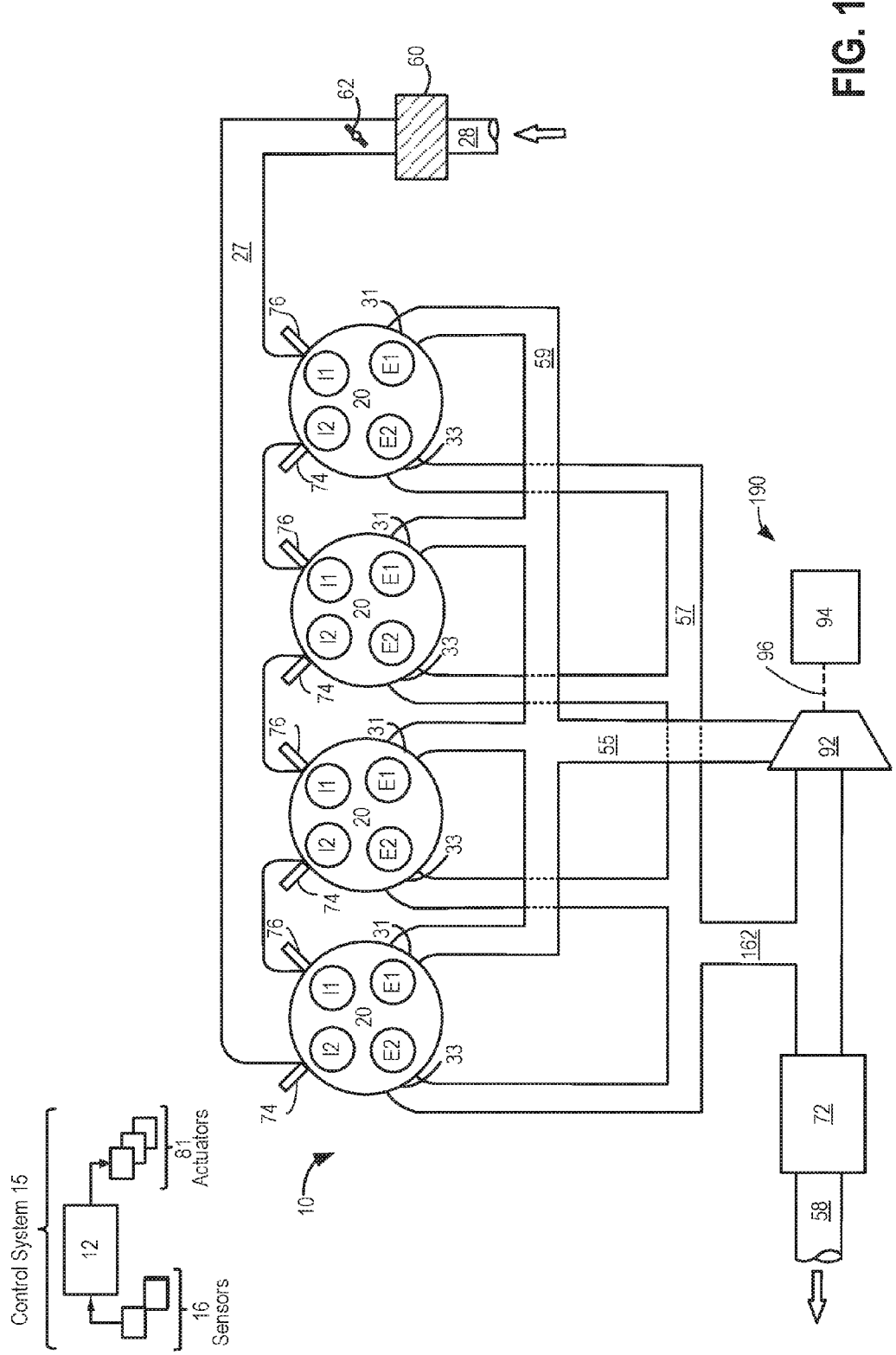
FIG. 1 shows a schematic depiction of a naturally aspirated engine system with a split exhaust manifold and a turbine-generator
Figure 2:
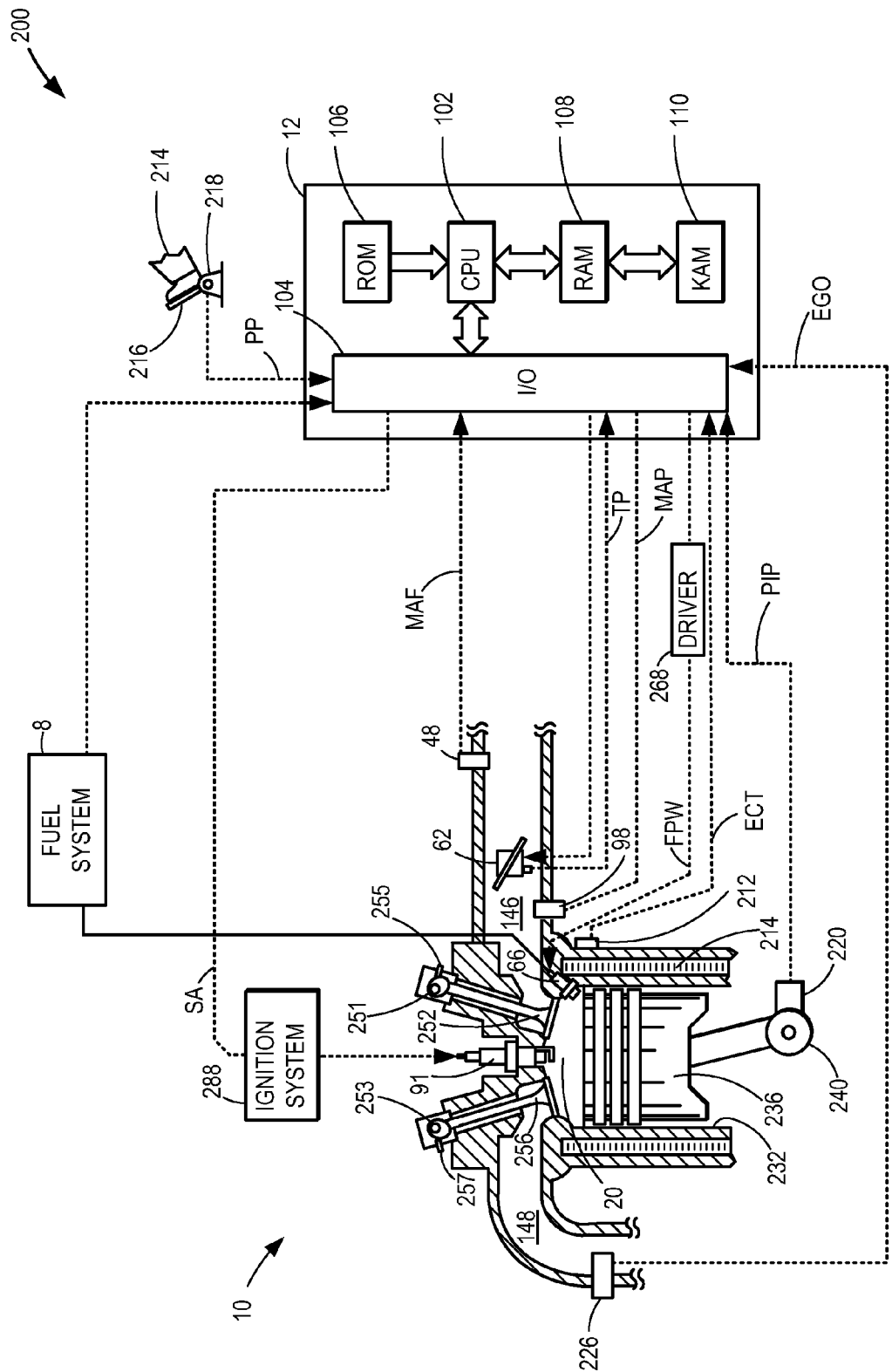
FIG. 2 shows a schematic depiction of a combustion chamber of the engine system of FIG. 1.
Figure 6:
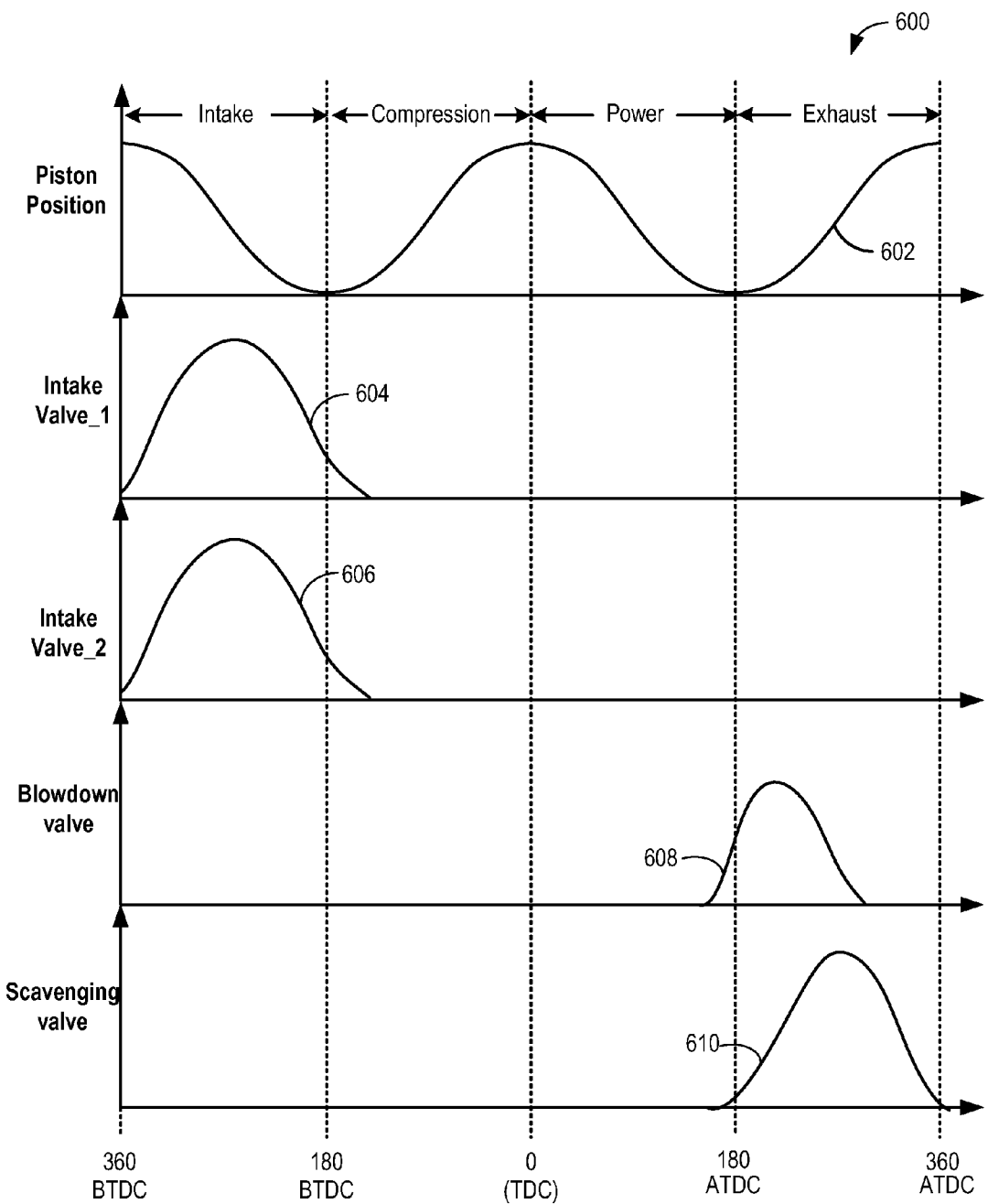
FIG. 6 shows an example normal intake and exhaust valve timing and duration, according to the present disclosure.
Figure 7:
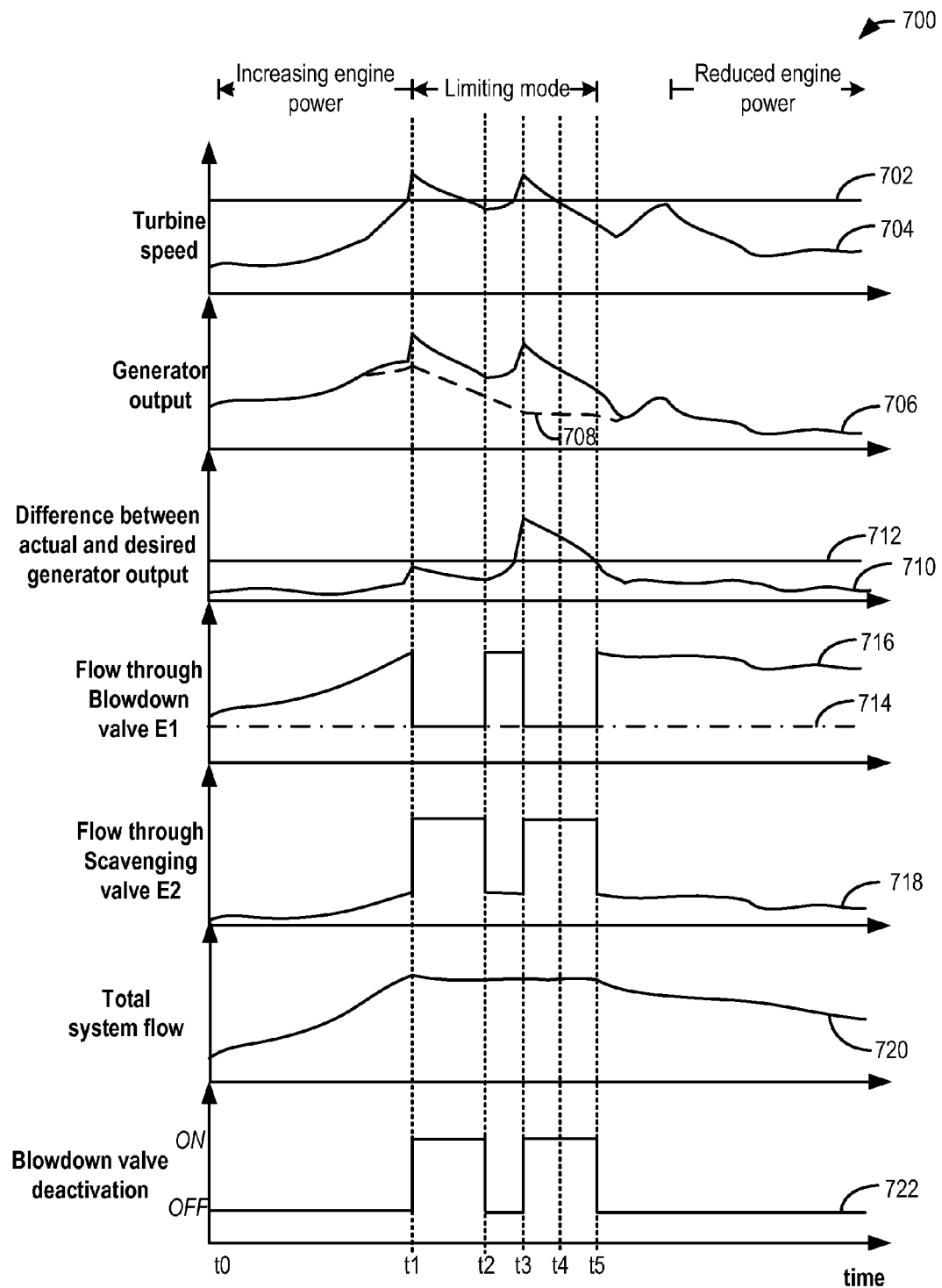
FIG. 7 shows an example map depicting valve deactivation based on turbine speed and/or generator output.

The following description relates to systems and methods for reducing exhaust energy delivered to a turbine driving a turbine-generator in a split exhaust engine system, such as engine system 10 of FIGS. 1-2 in order to prevent turbine over-speed conditions and/or to reduce a generator output. Specifically, the split exhaust engine system may include a first exhaust valve (also herein referred to as a blowdown valve) for delivering a blowdown portion of exhaust gas from an engine cylinder to the turbine-driven generator located in a first exhaust passage via a first exhaust manifold, and a second exhaust valve (also herein referred to as a scavenging valve) for delivering a scavenging portion of exhaust gas from the engine cylinder directly to an exhaust catalyst located downstream of the turbine-driven generator via a second exhaust manifold and a second exhaust passage bypassing a turbine of the turbine-driven generator. In response to a turbine speed greater than a threshold speed and/or a generator output greater than a desired output, an engine controller included in the engine system may be configured to perform a control routine, such as the routine of FIG. 3 to deactivate a number of blowdown valves in a plurality of engine cylinders to reduce an amount of exhaust energy delivered to the turbine. An example routine to determine a desired generator speed for determining the turbine speed threshold above which one or more blowdown valves may be deactivated is shown at FIG. 4. The number of blowdown valves deactivated may be determined according to the example routine of FIG. 5. An example of valve timings including valve timings of the blowdown valve during normal engine operation (that is, without blowdown valve deactivation) is illustrated at FIG. 6. An example adjustment of blowdown valve based on turbine speed and/or generator output is shown at FIG. 7.

By utilizing the systems and methods described herein, the technical effect of reducing exhaust energy delivered to the turbine of the turbine-driven generator via blowdown valve deactivation and without utilizing wastegate in the split exhaust engine system (e.g. engine system 10 at FIG. 1) may be achieved.

FIG. 1 shows a schematic diagram of a multi-cylinder internal combustion engine 10, which may be included in a propulsion system of an automobile. Engine 10 may include a plurality of combustion chambers (that is, cylinders) 20. In the depicted example, engine 10 includes three cylinders arranged in an in-line configuration. However, in alternate examples, engine 10 can include two or more cylinders such as 4, 5, 8, 10 or more cylinders, arranged in alternate configurations, such as V-6, I-6, V-12, opposed 4, boxed, etc.

Each cylinder 20 of engine 10 may be configured to receive intake air from an intake manifold 27 via an air intake passage 28. Intake passage 28 may include an air intake throttle 62 downstream of an air filter 60. The position of throttle 62 can be adjusted by control system 15 via a throttle actuator (not shown) communicatively coupled to controller 12. By modulating throttle 62, an amount of fresh air may be inducted from the atmosphere into engine 10 and delivered to the engine cylinders at or below barometric (or atmospheric) pressure via intake passage 28. Intake manifold 27 may be coupled to the combustion chambers via intake ports (not shown). Each intake port may supply air and/or fuel to the cylinder it is coupled to for combustion. Each cylinder intake port can selectively communicate with the cylinder via one or more intake valves. In the depicted example, each cylinder 20 is shown with two intake valves I1 and I2. In one example, an intake passage may be formed from intake manifold 27 selectively communicating with each intake valve. In other embodiments, an intake passage for a single cylinder may be split close to the cylinder into two adjacent paths with a wall in-between, each split path of the passage communicating with a single intake valve. In another example, each of the two intake valves may be controlled to open at specific engine speeds and therefore, may communicate through a common intake port with the intake manifold.

Each combustion chamber may exhaust combustion gases via two exhaust ports coupled thereto. In the depicted example, each cylinder 20 is coupled to a first exhaust port 31 via a first exhaust valve E1, and to a second exhaust port 33 via a second exhaust valve E2. Each exhaust port of each cylinder may lead to different exhaust manifolds for channeling a first initial portion of exhaust gas (also herein referred to as blowdown portion) and a second latter portion of exhaust gases (also herein referred to as scavenging portion) separately. For example, each of the first exhaust ports 31 from each of the cylinders 20 may combine into a first exhaust manifold 59. Similarly, each of the second exhaust ports 33 from each of the cylinders 20 may combine into a second exhaust manifold 57. In this way, each combustion chamber 20 may exhaust a blowdown portion of combustion gases into first exhaust manifold 59 via first exhaust valve E1, and exhaust a scavenging portion of combustion gases into second exhaust manifold 57 via second exhaust valve. Such an exhaust system including two exhaust manifolds, one manifold for conducting the blowdown portion of the exhaust, and the other manifold for conducting the scavenging portion of the exhaust will be referred to herein as the "split exhaust system".

Engine 10 may include a turbine-driven generator 190 located in a first exhaust passage 55 coupled to first exhaust manifold 59. Turbine-driven generator 190 may include an exhaust turbine 92 and a generator 94 coupled on a common shaft 96. While in some embodiments, a wastegate may be included in a bypass coupled between an inlet and outlet of the exhaust turbine to control an amount of exhaust gas delivered to the turbine, in the example discussed herein, the wastegate may not be included. Instead an amount of exhaust gas delivered to the turbine may be controlled by performing valve deactivation of the blowdown valves in one or more cylinders. By deactivating one or more blowdown valves, the amount of exhaust gas delivered to the turbine may be reduced. For example, during engine operating conditions when a turbine speed is greater than a threshold speed, and/or when a turbine-driven generator output is greater than a desired output, one or more blowdown valves may be deactivated to reduce the amount of exhaust energy delivered to the turbine. Further, the number of blowdown valves deactivated may be based on a rate of change of turbine speed, a difference between an actual generator output and a desired generator output greater than a threshold output, and an engine speed/load condition. Additional details of valve deactivation to reduced exhaust energy delivered to the turbine will be further elaborated with respect to FIGS. 3-7.

In this way, by utilizing valve deactivation instead of wastegate valve to reduce the amount of exhaust gas delivered to the turbine to prevent turbine over-speed and/or reduce generator output, bulky and expensive actuators for controlling wastegate may be avoided. Consequently, system cost and size may be reduced. Further, by avoiding including wastegate and its actuator, a volume of the exhaust passage upstream of the turbine may be reduced. Consequently, utilization of blowdown energy may be improved.

As discussed above, the exhaust manifolds may be designed to separately channel the blowdown and scavenging portions of the exhaust. First exhaust manifold 59 may channel the blowdown pulse of the exhaust to turbine 92 of turbine-generator 190 via first exhaust passage 55 while second exhaust manifold 57 may channel the scavenging portion of exhaust via a second exhaust passage 162 to downstream of turbine 92 and upstream of an emission control device 72. For example, exhaust valves E1 channel the blowdown portion of the exhaust gases through exhaust manifold 59 and first exhaust passage 55 to the turbine while exhaust valves E2 channel the scavenging portion of exhaust gases through exhaust manifold 57 via second exhaust passage 162 to emission control device 72. As such, the first exhaust valve may open earlier than the second exhaust valve, and may be closed at a timing earlier than the second exhaust valve.

Exhaust gases exiting turbine 92 may pass through emission control device 72 as well. Emission control device 72 can include multiple catalyst bricks, in one example. In another example, multiple emission control devices, each with multiple bricks, can be used. In some examples, emission control device 72 may be a three-way type catalyst. In other examples, emission control device 72 may include one or a plurality of a diesel oxidation catalyst (DOC), and a selective catalytic reduction catalyst (SCR). After passing through emission control device 72, exhaust gas may be directed out to a tailpipe 58.

In one example, a turbine speed and/or a generator output of turbine-generator 190 may be controlled by adjusting an amount of blowdown exhaust channeled to the turbine. For example, in order to reduce the amount of exhaust energy delivered to the turbine, one or more first exhaust valves E1 channeling the blowdown portion of the exhaust from the cylinder to the turbine via the first exhaust manifold may be deactivated. A number of exhaust valves that may be deactivated may be based on a rate of change of turbine speed, a difference between an actual and a desired generator output, and engine speed and load conditions. Details of deactivating one or more first exhaust valves (herein referred to as blowdown valves) will be further elaborated with respect to FIGS. 3-7.

In this way, combusted gases exiting a cylinder may be separated into two parts via two distinct exhaust passages formed by the split exhaust manifold. For example, in one combustion cycle, first exhaust valve E1 of cylinder 20 may channel a first portion of the exhaust, namely the blowdown portion, to turbine 92 via first exhaust passage 55, and a second exhaust valve E3 of the same cylinder (20) may direct a second portion of exhaust gases following the blowdown portion to an emission control device 72 via the second passage 162. The second portion of exhaust gases exiting via the second exhaust valve E2 may primarily be the scavenging portion of exhaust gases.

In FIG. 1, fuel injectors are shown coupled directly to the combustion chambers for injecting fuel directly therein in proportion to a pulse width of a signal FPW received from controller 12 via an electronic driver, for example. Each cylinder 20 is shown coupled with two injectors 74 and 76 per cylinder at each intake valve. In this manner, the fuel injectors provide what is known as direct injection of fuel into the combustion chamber. Each respective fuel injector may be mounted in the side of the respective combustion chamber or in the top of the respective combustion chamber, for example. In some examples, one or more fuel injectors may be arranged in intake manifold 27 in a configuration that provides what is known as port injection of fuel into the intake ports upstream of the respective combustion chambers. Though not shown in FIG. 1, fuel may be delivered to the fuel injectors by a fuel system including a fuel tank, a fuel pump, a fuel line, and a fuel rail.

In some examples, a distributorless ignition system (not shown) may provide an ignition spark to spark plugs (not shown) coupled to combustion chambers 20 in response to controller 12.

Engine 10 may be controlled at least partially by a control system 15 including controller 12 and by input from a vehicle operator via an input device (not shown). Control system 15 is shown receiving information from a plurality of sensors 16 (various examples of which are described herein) and sending control signals to a plurality of actuators 81. As one example, sensors 16 may include turbo-compressor inlet pressure and temperature sensors, and manifold air pressure (MAP) sensors located within the intake passage. Other sensors may include a throttle inlet pressure (TIP) sensor for estimating a throttle inlet pressure (TIP) and/or a throttle inlet temperature sensor for estimating a throttle air temperature (TCT) coupled downstream of the throttle in the intake passage. Additional system sensors and actuators are elaborated below with reference to FIG. 2. As another example, actuators 81 may include fuel injectors, and throttle 62. Controller 12 may receive input data from the various sensors, process the input data, and trigger the actuators in response to the processed input data based on instruction or code programmed therein corresponding to one or more routines. Example control routines are described herein with respect to FIGS. 3-5, which are carried out through interactions with the various components represented in FIGS. 1-2.

It should be appreciated that FIG. 1 shows various passages being maintained separate from one another various distances. Further, while various connections and couplings are described as such, the figures may illustrate direct coupling our connections, in which there are no other components there between. In one example, there are no other turbines upstream of turbine 92. As another example, valves E1 lead directly to turbine 92 without any other components, such as emission control devices, there between, although such could be added, if desired. In a further example, which can be combined with the previous examples, the passages from valves E2 in each and every cylinder of the engine may fully bypass turbine 92 such that no gas from any of these passages leads directly upstream of turbine 92, and all such gas is introduced only downstream of turbine 92 before reaching the device 72.

Referring to FIG. 2, it depicts a partial view 200 of a single cylinder of internal combustion engine 10. As such, components previously introduced in FIG. 1 are represented with the same reference numbers and are not re-introduced, and in one example FIGS. 1 and 2 may be combined as a common example configuration, such that components described with regard to FIG. 2 also may refer to the system of FIG. 1.

Engine 10 is depicted with combustion chamber (cylinder) 20, coolant sleeve 214, and cylinder walls 232 with piston 236 positioned therein and connected to crankshaft 240. Combustion chamber 20 is shown communicating with intake passage 146 and exhaust passage 148 via respective intake valve 252 and exhaust valve 256. As previously described in FIG. 1, each cylinder of engine 10 may exhaust combustion products along two conduits. In the depicted view 200, exhaust passage 148 represents the first exhaust port leading from the cylinder to the turbine (such as exhaust port 33 of FIG. 1) while the second exhaust conduit leading to the exhaust catalyst is not visible in this view.

As also previously elaborated in FIG. 1, each cylinder of engine 10 may include two (or more) intake valves and two (or more) exhaust valves. In the depicted view 200, intake valve 252 and exhaust valve 256 are located at an upper region of combustion chamber 20. Intake valve 252 and exhaust valve 256 may be controlled by controller 12 using respective cam actuation systems including one or more cams. The cam actuation systems may utilize one or more of cam profile switching (CPS), variable cam timing (VCT), variable valve timing (VVT) and/or variable valve lift (VVL) systems to vary valve operation. In the depicted example, each intake valve 252 is controlled by an intake cam 251 and each exhaust valve 256 is controlled by an exhaust cam 253. The position of intake valve 252 and exhaust valve 256 may be determined by valve position sensors 255 and 257, respectively.

In alternate embodiments, the intake and/or exhaust valve may be controlled by electric valve actuation. For example, cylinder 20 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

In one example, intake cam 251 includes separate and different cam lobes that provide different valve profiles (e.g., valve timing, valve lift, duration, etc.) for each of the two intake valves of combustion chamber 20. Likewise, exhaust cam 253 may include separate and different cam lobes that provide different valve profiles (e.g., valve timing, valve lift, duration, etc.) for each of the two exhaust valves of combustion chamber 20. In another example, intake cam 251 may include a common lobe, or similar lobes, that provide a substantially similar valve profile for each of the two intake valves.

In addition, different cam profiles for the different exhaust valves can be used to separate exhaust gases exhausted at low cylinder pressure from exhaust gases exhausted at exhaust pressure. For example, a first exhaust cam profile can open from closed position the first exhaust valve just before BDC (bottom dead center) of the power stroke of combustion chamber 20 and close the same exhaust valve well before top dead center (TDC) to selectively exhaust blowdown gases from the combustion chamber. Further, a second exhaust cam profile can be positioned to open from close a second exhaust valve at about the mid-point of the exhaust stroke and close it before TDC to selectively exhaust the scavenging portion of the exhaust gases.

Continuing with FIG. 2, exhaust gas sensor 226 is shown coupled to exhaust passage 148. Sensor 226 may be positioned in the exhaust passage upstream of one or more emission control devices, such as device 72 of FIG. 1. Sensor 226 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. The downstream emission control devices may include one or more of a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc.

Cylinder 20 can have a compression ratio, which is the ratio of volumes when piston 236 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 91 for initiating combustion. Ignition system 288 can provide an ignition spark to combustion chamber 20 via spark plug 91 in response to spark advance signal SA from controller 12, under select operating modes. However, in some embodiments, spark plug 91 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 20 is shown including one fuel injector 66. Fuel injector 66 is shown coupled directly to combustion chamber 20 for injecting fuel directly therein in proportion to the pulse width of signal FPW received from controller 12 via electronic driver 268. In this manner, fuel injector 66 provides what is known as direct injection (hereafter also referred to as "DI") of fuel into combustion cylinder 20. While FIG. 2 shows injector 66 as a side injector, it may also be located overhead of the piston, such as near the position of spark plug 91. Such a position may improve mixing and combustion when operating the engine with an alcohol-based fuel due to the lower volatility of some alcohol-based fuels. Alternatively, the injector may be located overhead and near the intake valve to improve mixing. In an alternate embodiment, injector 66 may be a port injector providing fuel into the intake port upstream of cylinder 20.

Fuel may be delivered to fuel injector 66 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. Fuel tanks in fuel system 8 may hold fuel with different fuel qualities, such as different fuel compositions. These differences may include different alcohol content, different octane, different heat of vaporizations, different fuel blends, and/or combinations thereof etc. In some embodiments, fuel system 8 may be coupled to a fuel vapor recovery system including a canister for storing refueling and diurnal fuel vapors. The fuel vapors may be purged from the canister to the engine cylinders during engine operation when purge conditions are met. For example, the purge vapors may be naturally aspirated into the cylinder via the first intake passage at or below barometric pressure.

Controller 12 is shown in FIG. 2 as a microcomputer, including a microprocessor unit 102, input/output ports 104, an electronic storage medium for executable programs and calibration values shown as a read only memory 106 in this particular example, random access memory 108, keep alive memory 110, and a data bus. Storage medium read-only memory 106 can be programmed with computer readable data representing instructions executable by microprocessor 102 for performing the methods and routines described below as well as other variants that are anticipated but not specifically listed. Controller 12 may receive various signals from sensors coupled to engine 10, in addition to those signals previously discussed, including measurement of induced mass air flow (MAF) from mass air flow sensor 48; engine coolant temperature (ECT) from temperature sensor 212 coupled to coolant sleeve 214; a profile ignition pickup signal (PIP) from Hall effect sensor 220 (or other type) coupled to crankshaft 240; throttle position (TP) from a throttle position sensor; absolute manifold pressure signal (MAP) from sensor 98, cylinder AFR from EGO sensor 226, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Based on input from one or more of the above-mentioned sensors, controller 12 may adjust one or more actuators, such as fuel injector 66, throttle 62, spark plug 91, intake/exhaust valves and cams, etc. The controller may receive input data from the various sensors, process the input data, and trigger the actuators in response to the processed input data based on instruction or code programmed therein corresponding to one or more routines. Example control routines will be described later with regard to FIGS. 3-5.

Figure 3:
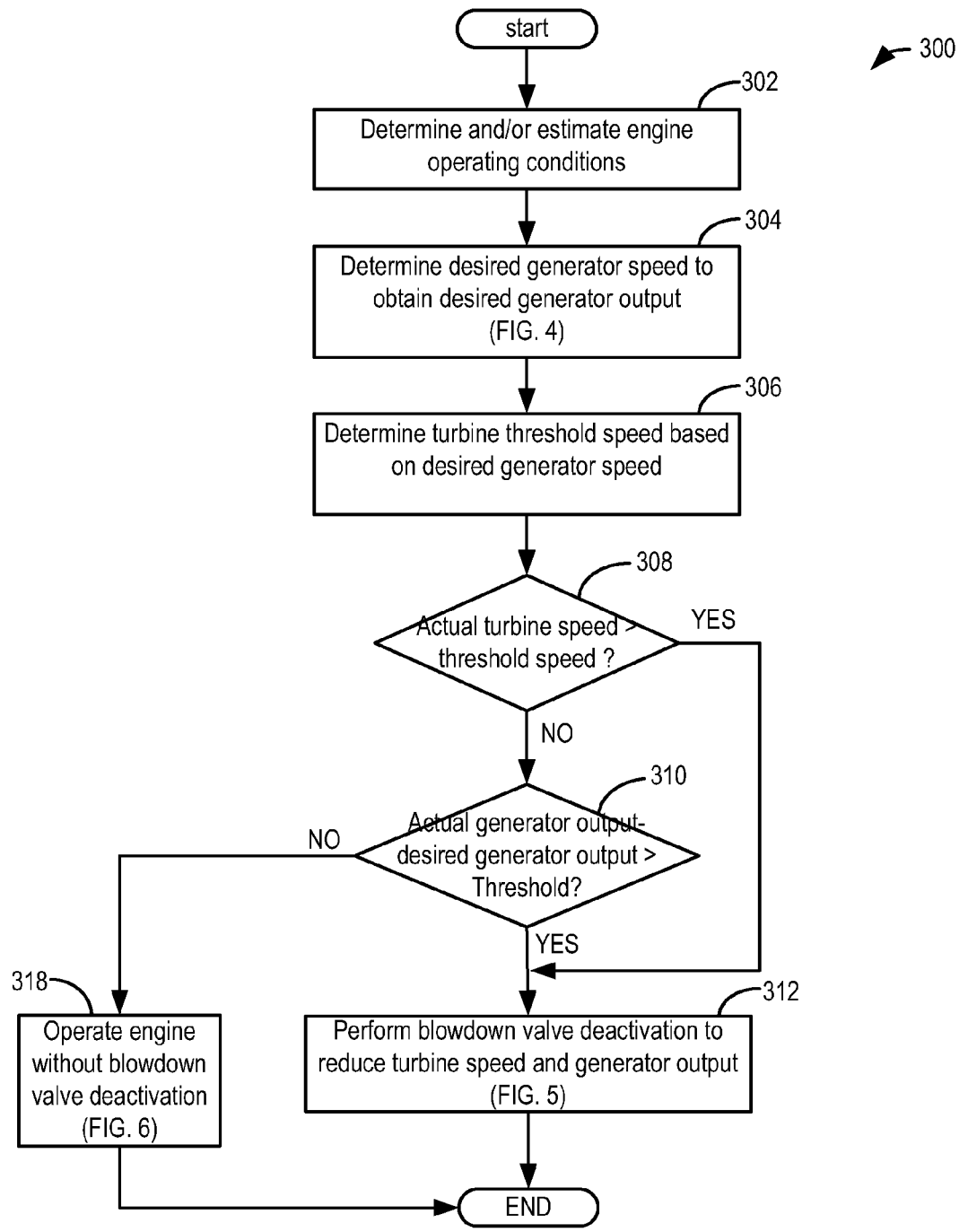
FIG. 3 shows a high level flow chart illustrating an example routine for reducing energy provided to a turbine of the turbine-generator.
Figure 4:
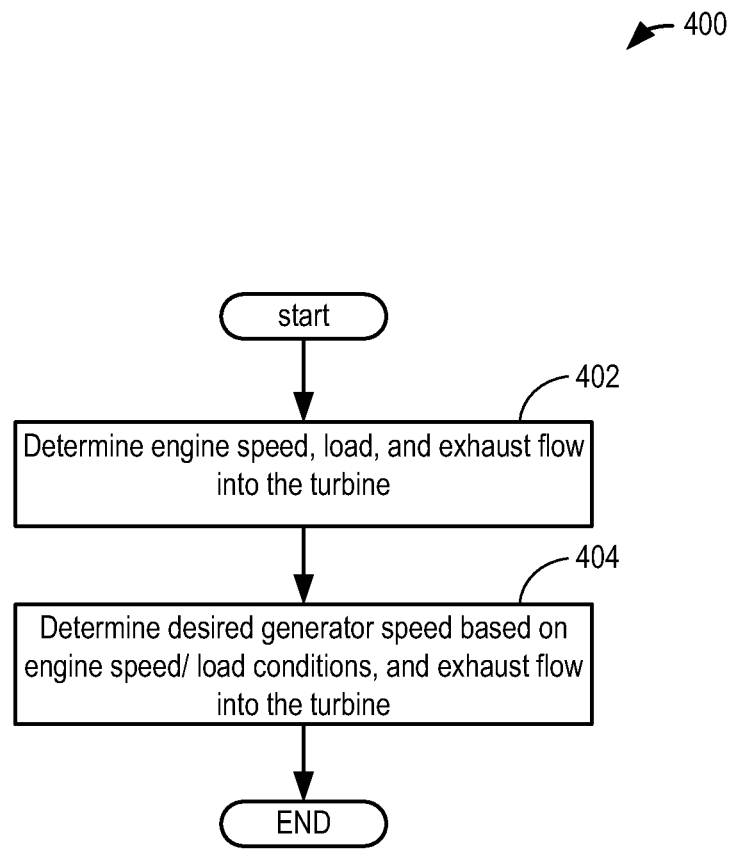
FIG. 4 shows a high level flow chart illustrating an example routine for determining a desired turbine-generator speed, to be used in conjunction with FIG. 3.

Turning to FIG. 3, a method 300 for adjusting blowdown exhaust mass flow delivered to a turbine of a turbine-generator (e.g., turbine-generator 190 at FIG. 1) included in a split exhaust system is provided. For example, by reducing an amount of blowdown exhaust mass flow to the turbine, turbine over-speed conditions may be prevented. Further, a turbine-generator output may be adjusted by adjusting the turbine speed. Therefore, by adjusting exhaust energy delivered to the turbine, the turbine speed and the generator output may be adjusted. The method of FIG. 3 may be stored as executable instructions in non-transitory memory of controller 12 shown in FIGS. 1-2 and carried out by the controller in combination with the various sensors, actuators, and engine components illustrated in FIGS. 1-2.

At 302, method 300 includes estimating and/or measuring vehicle operating conditions. Vehicle operating conditions may include but are not limited to turbine speed, generator speed, generator output, engine speed, accelerator position, throttle position, brake pedal position, vehicle speed, engine temperature, exhaust mass flow, engine load, and battery state of charge. As such, the generator output may be one or more of a generator output voltage, a generator output current, and a generator output power.

At 304, method 300 may include determining a desired generator speed based on the estimated engine operating conditions to obtain a desired generator output. Details of determining the desired generator speed will be further elaborated with respect to FIG. 4. Next, at 306, the method may include determining a turbine threshold speed based on the desired generator speed at current estimated engine speed and load conditions. For example, the turbine threshold speed may be a turbine speed above which an efficiency of the turbine may decrease.

Upon determining the desired threshold speed, at 308, method 300 may include determining if an actual turbine speed is greater than the threshold speed. If the answer at 308 is YES, the method may proceed to 312. At 312, the method may include performing blowdown valve deactivation to reduce turbine speed. For example, one or more of the blowdown valves may be deactivated via hydraulically actuated lifters, or via a decoupling pin in the valvetrain, or via a lost motion mechanism, or via a cam profile switching (CPS) mechanism in which a cam profile with no lift may be used for deactivated valves. In one example, deactivation of the blowdown valve(s) may be controlled by a cam-based VDE actuator. In another example, a single cylinder valve actuator may deactivate blowdown valves in a plurality of cylinders. As such, deactivated valves may be held in a closed position for a cycle of the cylinder (or held in a fixed position for the cycle) whereas active valve operation may refer to a valve opening and closing during a cycle of the cylinder. Details of blowdown valve deactivation to reduce turbine speed will be further elaborated with respect to FIG. 5.

Returning to 308, if it is determined that the actual turbine speed is less than the threshold turbine speed; the method may proceed to 310. At 310, the method may include determining if a difference between an actual generator output and a desired generator output is greater than a threshold difference. If the answer at 310 is YES, the method may proceed to 312 to perform blowdown valve deactivation to reduce turbine speed. By reducing the turbine speed, the generator output of the turbine-generator may be decreased. Details of blowdown valve deactivation to reduce turbine speed, and consequently generator output will be further elaborated with respect to FIG. 5. If the answer at 310 is NO (that is, if the difference is less than the threshold), the method may proceed to 318. At 318, the method may include operating the engine without blowdown valve deactivation. That is, if it is determined that the turbine speed is below threshold and the generator output is below threshold, valve deactivation to reduce exhaust energy to turbine may not be performed. In other words, engine may be operated normally, wherein the normal engine operation may include opening the blowdown valve first to deliver an initial portion of exhaust energy to turbine via the blowdown valve and then subsequently opening a scavenging valve to deliver a latter portion of the exhaust energy to the exhaust catalyst. Details of normal engine operation will be further elaborated with respect to FIG. 6.

In this way, in response to the a turbine speed greater than the threshold speed or the difference between the actual generator output and the desired generator output greater than the desired output, blowdown valve deactivation may be performed to reduce the amount of blowdown energy delivered to the turbine. By utilizing blowdown valve deactivation, additional need for a wastegate to divert exhaust flow away from the turbine may not be required. Consequently, system production cost may be reduced. Further, by avoiding the wastegate, a volume upstream of the turbine may be reduced. Consequently, utilization of blowdown energy may be improved.

In one example, deactivation of one or more blowdown valves may be performed in response to the actual generator output greater than the desired generator output.

FIG. 4 shows an example method 400 for determining a desired generator speed of a turbine-generator (e.g. turbine-generator 190 at FIG. 1) located in a first exhaust manifold (e.g. first exhaust manifold 59 at FIG. 1) of an engine system with split exhaust manifold (e.g. engine system 10 at FIG. 1). The desired generator speed may be a generator speed at which the turbine-generator may operate with respect to current engine operating conditions in order to obtain a desired generator output. The method of FIG. 4 may be used in conjunction with the method of FIG. 3. For example, method 400 may be performed at step 304 of method 300. The method of FIG. 4 may be stored as executable instructions in non-transitory memory of controller 12 shown in FIGS. 1-2.

At 402, the routine may include determining engine operating conditions including engine speed, engine load, estimated exhaust temperature, and an exhaust mass flow to the turbine. The exhaust mass flow to the turbine may be an amount of exhaust mass flow delivered to the turbine of the turbine-generator via the first exhaust valve and the first exhaust passage. As discussed above, a first portion of the exhaust gas may be delivered to the turbine via the first exhaust valve and the first exhaust passage during a first portion of the exhaust phase.

Upon determining engine operating conditions, the method includes, at 404, determining a desired generator speed based on the current engine speed/load conditions, and further based on exhaust mass flow into the turbine. In one example, the desired generator speed may be determined from a look-up table storing the desired generator speed for a plurality of engine speed and load conditions. For example, at each of a plurality of engine speed and load conditions, the desired generator speed may be determined at least based on the engine speed and load condition, and the exhaust mass flow into the turbine. Further, the desired generator speed may additionally be based on a turbine efficiency and a generator efficiency at each of the plurality of engine speed and load conditions. A look-up table may be generated including the desired speed for each speed/load condition and the look up table may be utilized to determine the desired generator speed during engine operation. As such, a threshold turbine speed may be determined based on the desired generator speed. In an alternate embodiment, the threshold turbine speed may be a maximum speed which provides acceptable durability of the turbine and generator under current conditions, for example at the current exhaust temperature.

In this way, by setting the desired generator speed based on engine speed/load conditions, and exhaust flow to the turbine, an electrical output of the turbine-generator may be adjusted for improved efficiency and performance.

Figure 5:
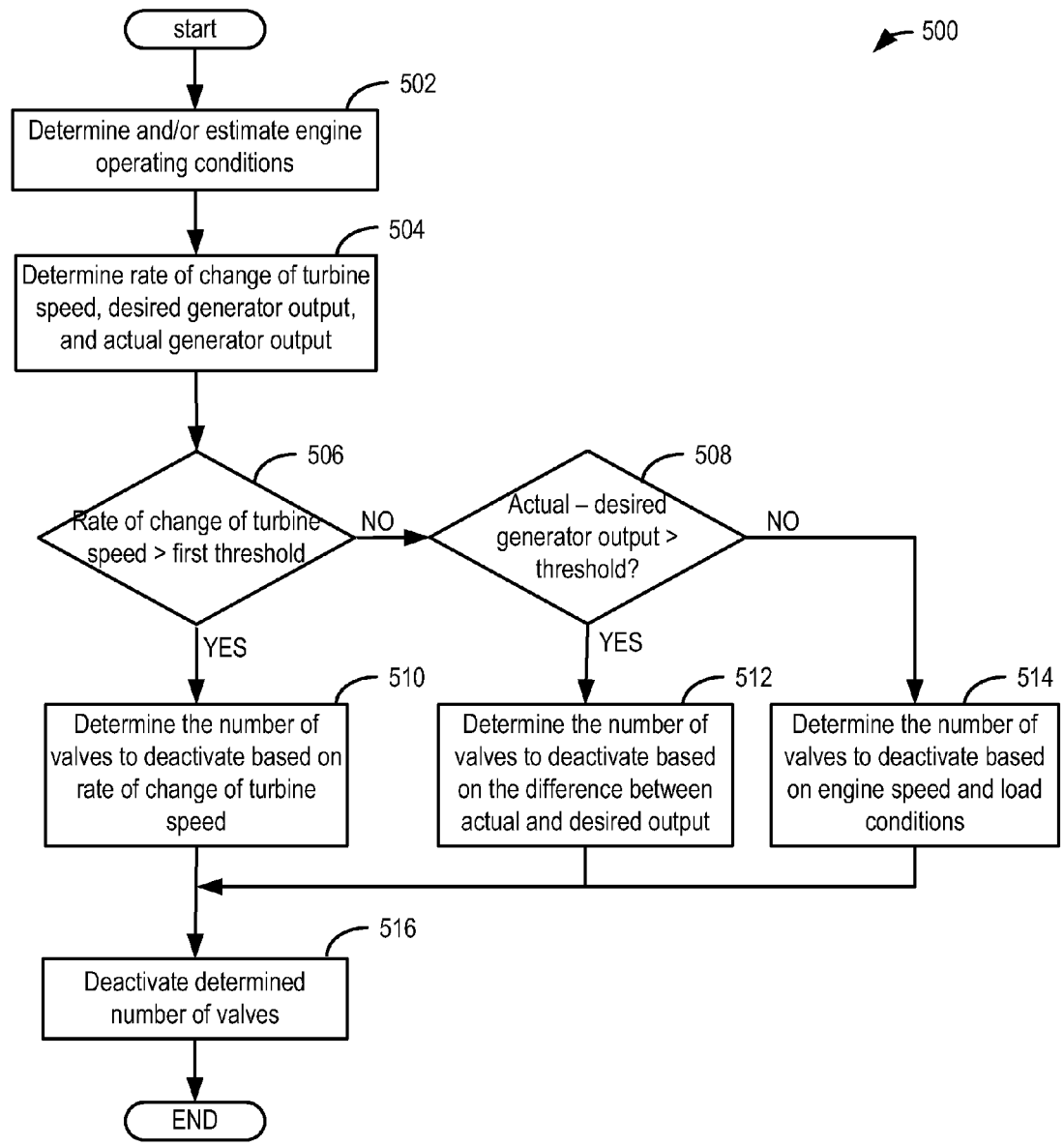
FIG. 5 shows a high level flow chart illustrating an example routine for performing valve deactivation for reducing energy provided to the turbine of the turbine-generator, to be used in conjunction with FIG. 3.

FIG. 5 shows a method 500 for performing valve deactivation to reduce exhaust energy to a turbine of a turbine-generator to prevent turbine over-speed conditions and/or reduce a generator output. In particular, FIG. 5 shows method 500 for determining a number of blowdown valves to be deactivated when a turbine speed increases above a threshold speed or when a generator output increases above a desired output. The method of FIG. 5 may be used in conjunction with the method of FIG. 3. For example, method 500 may be performed at step 312 of method 300. The method of FIG. 5 may be stored as executable instructions in non-transitory memory of controller 12 shown in FIGS. 1-2.

At 502, method 500 may include determining and/or estimating engine operating conditions. Engine operating conditions may include but are not limited to turbine speed, generator speed, generator output, engine speed, accelerator position, throttle position, brake pedal position, vehicle speed, engine temperature, exhaust mass flow, and engine load. Next, at 604, the method may include determining a rate of change of turbine speed, a desired generator output, and an actual generator output based on the engine operating conditions. As such, the desired generator output may be based on an engine speed, an engine load, an exhaust flow rate into the turbine, and a battery state of charge.

Next, at 506, the method may include determining if the rate of change of turbine speed is greater than a first threshold rate. The first threshold rate may be a function of turbine speed, exhaust temperature, and other factors. For example at high turbine speeds the threshold rate may be lower, to avoid over-speed damage to the turbine. If yes, the routine may proceed to 510. At 510, the method may include determining a number of valves to deactivate based on the rate of change of turbine speed. For example, in a four-cylinder engine system including one exhaust blowdown valve per cylinder, maximum number of blowdown valves that may be deactivated is four. If the rate of change of turbine speed is greater than a second threshold rate, all the blowdown exhaust valves may be deactivated. That is, the number of valves deactivated may be four. If the rate of change of turbine speed is less than the second threshold rate, and greater than the first threshold rate, less than maximum number of blowdown valves may be deactivated. Further, as the rate of change of turbine speed increases, the number of blowdown valves deactivated may increase.

Returning to 506, if the rate of change of turbine speed is not greater than the threshold rate, the method may proceed to 508. At 508, the method may include determining if a difference between an actual generator output and a desired generator output is greater than a second threshold output difference. If the answer at 508 is YES, the method may proceed to 512. At 512, the method may include determining the number of blowdown valves to deactivate based on the difference between the actual generator output and the desired generator output. For example, the number of blowdown valves to deactivate may increase as the difference between the actual generator output and the desired generator output increases.

Returning to 508, if the answer at 508 is NO, that is, if the difference between the actual generator output and the desired generator output is less than the second threshold output difference, the method may proceed to 514. At 514, the method may include determining the number of valves to deactivate based on engine speed and load conditions. In one example, the number of valves to deactivate may be based on mass air flow into the engine in addition to engine speed and load conditions.

In the example depicted herein, the number of valves to deactivate based on the rate of change of turbine speed may be greater than the number of valves to deactivate based on the difference between the actual and the desired generator output; and the number of valves to deactivate based on the difference between the actual and the desired generator output may be greater than the number of valves to deactivate based on engine speed and load conditions.

Upon determining the number of valves to deactivate (based on the rate of change of turbine speed, or the difference between the actual and the desired generator output, or the engine speed/load conditions); the method may proceed to 516. At 516, the routine may include deactivating the determined number of blowdown valves. For example, the blowdown valve may be deactivated via hydraulically actuated lifters, or via a decoupling pin in the valvetrain, or via a lost motion mechanism, or via a cam profile switching (CPS) mechanism in which a cam profile with no lift may be used for deactivated valves. In one example, deactivation of the blowdown valve may be controlled by a cam-based VDE actuator. In another example, a single cylinder valve actuator may deactivate blowdown valves in a plurality of cylinders. As such, deactivated valves may be held in a closed position for a cycle of the cylinder (or held in a fixed position for the cycle) whereas active valve operation may refer to a valve opening and closing during a cycle of the cylinder.

In this way, by deactivating one or more blowdown exhaust valves, the amount of exhaust energy delivered to the turbine may be reduced to prevent turbine over-speed conditions and/or to reduce the generator output.

In one example, valve deactivation may be utilized to expedite heating of the exhaust catalyst in the split exhaust engine system. For example, during conditions when a temperature of the catalyst is below a threshold temperature (e.g. catalyst light_off temperature), the blowdown valves in all the engine cylinders may be deactivated to direct all of the exhaust energy via the scavenging valve and the second exhaust passage to the exhaust catalyst. In this way, by supplying all of the exhaust energy to the catalyst, heating of the catalyst may be expedited. In another example, during catalyst warm-up conditions (when the catalyst temperature is below the threshold temperature), a majority of the exhaust energy may be directed to the exhaust catalyst by deactivating a majority of the blowdown valves during catalyst warm-up conditions.

In one example a method for an engine including a first exhaust passage directly coupled to a turbine generator and a second exhaust passage directly coupled to an exhaust catalyst, an outlet of the turbine coupled to the catalyst via a third exhaust passage may comprise: flowing exhaust gas to the turbine via a first exhaust valve, the first exhaust valve coupling an engine cylinder to the first exhaust passage via a first exhaust manifold; flowing exhaust gas to the catalyst via a second exhaust valve, the second exhaust valve coupling the engine cylinder to the second exhaust passage via a second exhaust manifold; and in response to a speed of the turbine greater than a threshold speed, selectively deactivating the first exhaust valve on a number of cylinders, wherein the number of cylinders is based on one or more of a rate of change of the turbine speed, a difference between an actual generator output and a desired generator output greater than a threshold difference, an engine speed, and an engine load. Further, the blowdown valves may be selectively deactivated on the number of cylinders in response to a generator output greater than a threshold output. Still further, the blowdown valves on the number of cylinders may be selectively deactivated in response to a difference between an actual generator speed and a desired generator speed greater than a threshold generator speed, wherein the desired generator speed is based on an engine speed, an engine load, an amount of exhaust mass flow into the turbine via the first exhaust valve, and a battery state of charge. In response to the turbine speed less than the threshold speed, and the generator output less than the threshold output, advancing a timing of the first exhaust valve with respect to a timing of the second exhaust valve. Further, in response to a temperature of the exhaust catalyst less than a threshold temperature, selectively deactivating the first exhaust valve on all of the cylinders to expedite warm up of the exhaust catalyst.

Now turning to FIG. 6, map 600 depicts example intake valve timings and exhaust valve timings, with respect to a piston position, for an engine system including a first exhaust passage and a second, different exhaust passage. The valve timings depicted in FIG. 6 may be a normal valve timing that may be utilized during normal engine operating conditions, which may include a turbine speed less than a threshold speed and a generator output less than a threshold output. For example, during normal engine operation, a first amount of exhaust gas may be delivered to a turbine of a turbine-generator included in the first exhaust passage through a first exhaust valve (also herein referred to as a blowdown exhaust valve), and a second amount of the exhaust gas may be delivered to an exhaust catalyst included in the second exhaust passage through a second exhaust valve (also herein referred to as a scavenging exhaust valve).

Map 600 illustrates an engine position along the x-axis in crank angle degrees. Curve 602 depicts piston positions (along the y-axis), with reference to their location from top dead center (TDC) and further with reference to their location within the four strokes (intake, compression, power and exhaust) of an engine cycle.

During engine operation, each cylinder typically undergoes a four stroke cycle including an intake stroke, compression stroke, expansion stroke, and exhaust stroke. During the intake stroke, generally, the exhaust valves close and intake valves open. Air is introduced into the cylinder via the corresponding intake passage, and the cylinder piston moves to the bottom of the cylinder so as to increase the volume within the cylinder. The position at which the piston is near the bottom of the cylinder and at the end of its stroke (e.g. when the combustion chamber is at its largest volume) is typically referred to by those of skill in the art as bottom dead center (BDC). Herein, the intake stroke BDC is indicated as 180 degrees before top dead center (180 BDC). During the compression stroke, generally the intake valves and exhaust valves are closed. The piston moves toward the cylinder head so as to compress the air within combustion chamber. The point at which the piston is at the end of its stroke and closest to the cylinder head (e.g. when the combustion chamber is at its smallest volume) is typically referred to by those of skill in the art as top dead center (TDC). Herein, the compression stroke top dead center is indicated as 0 degrees top dead center (0 TDC). In a process herein referred to as injection, fuel is introduced into the combustion chamber. In a process herein referred to as ignition, the injected fuel is ignited by known ignition means, such as a spark plug, resulting in combustion. During the expansion stroke, the expanding gases push the piston back to BDC. Herein, the expansion stroke (also referred to as power stroke) BDC is indicated as 180 degrees after top dead center (180 ATDC). A crankshaft converts this piston movement into a rotational torque of the rotary shaft. During the exhaust stroke, exhaust valves are opened to release the residual combusted air-fuel mixture to the corresponding exhaust passages and the piston returns to TDC.

Curve 604 depicts a first intake valve timing, lift, and duration for a first intake valve (Intake valve_1) coupled to an intake passage of the engine cylinder while curve 606 depicts a second intake valve timing, lift, and duration for a second intake valve (Intake valve_2) coupled to the intake passage of the engine cylinder. Curve 608 depicts a first exhaust valve timing, lift, and duration for the first exhaust valve (blowdown valve) coupled to the first exhaust passage of the engine cylinder, while curve 610 depicts a second exhaust valve timing, lift, and duration for the second exhaust valve (scavenging valve) coupled to the second exhaust passage of the engine cylinder. As previously elaborated, the first and second exhaust passages may be separate from, but arranged parallel to each other.

In the depicted example, the first intake valve (Intake valve_1) and the second intake valve (Intake valve_2) may be opened at a common intake valve timing, starting at or just before 360 degrees BTDC, and ending at or just after 180 degrees BTDC. Additionally, in this example, both the first and second intake valves are opened with the same amount of lift and for the same duration. In other examples, the intake valve opening and/or closing timings may be staggered while the duration and the lift of the intake valves may be essentially the same.

Now turning to the exhaust valves, the first exhaust valve is opened at the first exhaust valve opening timing that is earlier in the engine cycle than the second exhaust valve opening timing at which the second exhaust valve is opened. In other words, the first exhaust valve opening timing may be advanced relative to the second exhaust valve opening timing. Specifically, the second exhaust valve may be opened at or just prior to 180 degrees ATDC, while the timing of opening of the first exhaust valve may be advanced from the second exhaust valve opening timing. In this way, the first exhaust valve may be opened before the start of an exhaust stroke, just as the piston travels towards the BDC near the end of the power stroke, and may close before the exhaust stroke ends. In comparison, the second exhaust valve may be opened after the first exhaust valve is opened (e.g. at or just before the start of the exhaust stroke) and may remain open until the exhaust stroke ends or until a subsequent intake stroke has commenced. Additionally, the first exhaust valve may be opened with a first, lower amount of valve lift while the second exhaust valve may be opened with a second, higher amount of valve lift. While the depicted example illustrates different timing, lifts and durations for the different exhaust valves, it will be appreciated that in alternate embodiments, the exhaust valves may have the same amount of valve lift and/or same duration of opening while opening at staggered timings.

By opening the first exhaust valve prior to opening the second exhaust valve, a majority of the blowdown energy may be directed to the turbine coupled to the turbine-generator. Further, by opening the second exhaust valve, excess exhaust energy may be directed to the exhaust catalyst, thereby decreasing the backpressure between the turbine inlet and the exhaust port, which may reduce pumping penalty.

In one example, where the first and second exhaust valves are coupled to an exhaust valve actuator, a valve actuator may be adjusted to open the first exhaust valve at the first timing while opening the second exhaust valve at the second timing. The valve actuator may also be adjusted to enable the first exhaust valve to be opened with the first amount of valve lift for the first duration while opening the second exhaust valve with the second, different amount of valve lift for the second duration.

In another example, a cam profile of the first exhaust valve can be adjusted to open and close the first exhaust valve to selectively exhaust blowdown gases of the cylinder into the first exhaust passage. On the other hand, the cam profile of the second exhaust valve may be adjusted to open the second exhaust valve to selectively exhaust the remaining residual gases of the cylinder into the second exhaust passage.

In this way, using different exhaust valve timings, engine efficiency can be increased while engine emissions are reduced by separating exhaust gases released at higher pressure (e.g., expanding blow-down exhaust gases in a cylinder before time when a piston of the cylinder reaches bottom dead center expansion stroke) from exhaust gases released at lower pressure (e.g., residual exhaust gases that remain in the cylinder after blow-down) into the different exhaust passages. In particular, exhaust energy can be transferred from the blowdown gases to one of two exhaust passages to operate a turbine-generator. At the substantially same time, residual gases may be directed to the other exhaust of the two exhaust passages to heat a catalyst, thereby reducing engine emissions. In this way, exhaust gases can be used more efficiently than simply directing all the exhaust gas of a cylinder through a single, common exhaust port. As such, several advantages may be achieved. For example, the average exhaust gas pressure supplied to the turbine can be increased to improve turbine-generator output. Additionally, fuel economy may be improved and emissions may be reduced by decreasing an engine warm-up time. Further, the method can reduce engine emissions since at least a portion of cylinder exhaust gases are directly routed from the cylinder to the catalyst.

Turning to FIG. 7, it shows a map 700 depicting an example operation of a blowdown exhaust valve (e.g. valve E1 at FIG. 1) to adjust exhaust mass flow to a turbine of a turbine-generator (e.g. turbine-generator 190 at FIG. 1) included in an exhaust system of a split exhaust engine system, such as the engine system 10 at FIG. 1. The sequence of FIG. 7 may be provided by executing instructions in the system of FIGS. 1-2 according to the methods of FIGS. 3, 4, and 5. Vertical markers at times t0-t6 represent times of interest during the sequence. In all the plots discussed below, the X axis represents time and time increases from the left side of each plot to the right side of each plot.

The first plot from top of FIG. 7 depicts turbine speed versus time. The Y axis represents a turbine speed of the turbine-generator and the turbine speed increases in the direction of the Y axis arrow. Trace 704 represents an actual turbine speed, and horizontal line 702 represents a threshold turbine speed.

The second plot from top of FIG. 7 depicts generator output versus time. The Y axis represents a generator output and the generator output increases in the direction of the Y axis arrow. Trace 706 represents an actual generator output, and trace 708 represents a desired generator output.

The third plot from top of FIG. 7 depicts difference between the actual generator output and the desired generator output, and the difference increases in the direction of the Y axis arrow. Trace 710 represents the difference, and horizontal line 712 represents a threshold difference.

The fourth plot from top of FIG. 7 depicts exhaust mass flow through the blowdown exhaust valve versus time. The Y axis represents a flow through the blowdown exhaust valve and the flow through the blowdown valve increases in the direction of the Y axis arrow. Trace 716 represents the flow through the blowdown exhaust valve. For example, exhaust mass flow may be delivered from an engine cylinder to the turbine via the blowdown valve and the first exhaust passage. Horizontal line 714 represents flow through the blowdown valve when the blowdown valve is deactivated. For example, when the blowdown valve is deactivated, exhaust may not flow through the turbine.

The fifth plot from top of FIG. 7 depicts exhaust mass flow through the scavenging valve (e.g. scavenging valve E2 at FIG. 1) versus time. The Y axis represents the flow through the scavenging valve and the flow through the scavenging valve increases in the direction of the Y axis arrow. Trace 718 represents the exhaust mass flow through the scavenging valve. For example, exhaust mass flow may be delivered from the engine cylinder directly to the catalyst bypassing the turbine via the scavenging valve and the second exhaust passage.

The sixth plot from top of FIG. 7 depicts total exhaust flow through an exhaust catalyst (e.g. catalyst 72 at FIG. 1) versus time. The Y axis represents the total exhaust flow and the total exhaust flow increases in the direction of Y axis arrow. Trace 720 represents the total exhaust flow.

The seventh plot from top of FIG. 7 depicts blowdown valve deactivation condition (ON/OFF) versus time. The Y axis represents the blowdown valve deactivation condition. Trace 722 represents the blowdown valve deactivation condition.

As such, the threshold turbine speed of the turbine-driven generator may be based on a desired generator speed to obtain the desired generator output; and the desired generator speed may be based on exhaust mass flow to the turbine via the blowdown exhaust valve and a first exhaust passage (e.g. passage 59 at FIG. 1), the turbine-driven generator located in the first exhaust passage. The desired generator speed may be further based on current engine speed and load conditions. The desired generator speed may be obtained as discussed above at FIG. 4.

Further, in the illustrated example of FIG. 7, the blowdown valves of all the cylinders may be controlled together. That is, all the blowdown valves may be deactivated and reactivated at the same time. When all the blowdown valves are controlled together, deactivation of the blowdown valves may result in no exhaust flow via the blowdown valves and hence, no exhaust energy may be delivered to the turbine while all of exhaust energy may be directly to the exhaust passage (e.g. exhaust passage 58) upstream of the exhaust catalyst and downstream of the turbine-driven generator. In some examples, when all the blowdown valves are deactivated, a minimum amount of exhaust may flow through the blowdown valves resulting in delivering a minimum amount of exhaust to the turbine while a majority of exhaust energy may be delivered directly to the exhaust passage upstream of the exhaust catalyst and downstream of the turbine-driven generator.

At times between t0 and t1, the turbine of the turbine-generator may be operating at the turbine speed (704) below the threshold speed (702). The flow through the turbine via the blowdown valve (716) may increase (as a result of increasing engine speed and load, for example). Consequently, the turbine speed may increase but may remain below the threshold speed. Further, the generator output (706) may increase. However, the difference between the desired generator output and the actual generator output (710) may remain below a first threshold (712). Therefore, reduction in turbine speed to decrease the turbine speed or the generator output may not be required. As a result, the engine may be operated without blowdown valve deactivation.

At time t1 the turbine speed (704) may be above the threshold speed (702). Therefore, in order to prevent turbine over-speed conditions, the blowdown valves may be deactivated at t1 (722). Specifically, the blowdown valve of all cylinders of the engine may be deactivated; while not deactivating the scavenging valve of all cylinders of the engine. As such, the blowdown valve may be deactivated via hydraulically actuated lifters, or via a cam profile switching (CPS) mechanism, in which a cam profile with no lift may be used for deactivated valves. In one example, deactivation of the blowdown valve may be controlled by a cam-based VDE actuator. In another example, a single cylinder valve actuator may deactivate blowdown valves in a plurality of cylinders. As such, deactivated valves may be held in a closed position for a cycle of the cylinder (or held in a fixed position for the cycle). As a result of the blowdown valve deactivation, exhaust may not flow through the turbine, and all of the exhaust may be directed to the exhaust catalyst via the scavenging valve bypassing the turbine (718). Consequently, between t1 and t2, the turbine speed may decrease but may continue to remain above the threshold speed until just before t2.

At time t2 the turbine speed may decrease below the threshold speed. Further, the difference between the actual and the desired generator output may be below the threshold difference. Therefore, the deactivated blowdown valve may be reactivated to allow exhaust flow to the turbine.

At times between t2 and t3, due to reactivation of the blowdown valves at t2, exhaust flow through the blowdown valve to the turbine may increase (716) and exhaust flow through the scavenging valve may decrease (718). Consequently, the turbine speed may increase but may remain below the threshold speed until just before t3. Further at t2, and between t2 and t3, the actual generator output may be greater than the desired generator output. However, the difference between the actual and the desired generator output (710) may be below the threshold difference (712).

Next, at time t3, the turbine speed may increase above the threshold speed. Further, at time t3, the actual generator output (706) may be greater than the desired generator output (708), and the difference between the actual and the desired generator output (710) may increase above the threshold difference (712). Therefore, in order to reduce the turbine speed and the generator output, the blowdown valves may be deactivated (722). As a result of blowdown valve deactivation at t3, the turbine speed, and the generator output may decrease between t3 and t4. However, the turbine speed (704) may continue to be above the threshold speed (702) and the difference between the actual and the desired generator output (710) may be above the threshold difference (712). Consequently, between t3 and t4, the blowdown valve may continue to be deactivated and all of the exhaust may bypass the turbine and flow directly to the exhaust catalyst via the scavenging valve.

Next, at times t4, and between t4 and t5, the turbine speed (704) may decrease below the threshold speed (702). However, the difference between the actual and the desired generator output (710) may be above the threshold difference (712). Consequently, the turbine speed may be further decreased to decrease the generator output. Therefore, in order to further decrease the turbine speed, the blowdown valves on all cylinders may continue to be deactivated. Consequently, the exhaust flow through the blowdown valve may decrease substantially (e.g., exhaust flow through the blowdown valves of all the cylinders may be zero) and all of the exhaust flow may by pass the turbine and may be channeled via the scavenging valve directly to the catalyst.

Next, at time t5 and beyond, the turbine speed (704) may be below the threshold speed (702), and the difference may be below the threshold difference (714). Therefore the blowdown valves may not be deactivated. In other words, the engine may resume normal operation without blowdown valve deactivation. Normal operation may include operating the blowdown valve at a first blowdown valve timing and operating the scavenging valve at a second scavenging timing. As such, the first blowdown valve timing may be advanced with respect to the second scavenging valve timing in order to direct a majority of blowdown exhaust energy to the turbine. Further, by opening the scavenging valve later during the exhaust cycle, cylinder pressure may be reduced from the high back-pressure upstream of the turbine inlet, to a lower pressure downstream of the turbine. Consequently pumping losses may be reduced. Details of valve timings for normal engine operation are elaborated at FIG. 6.

While the example illustrated herein depicts controlling all the blowdown valves together, in some examples, in a multi-cylinder engine, each blowdown valve in each cylinder may be controlled individually. That is, the activation or deactivation of each blowdown valve in each cylinder may be controlled individually. When each blowdown valve is controlled individually, the number of blowdown valves that may be deactivated (e.g., blowdown valve deactivation in response to the turbine speed greater than the threshold speed and/or in response to the difference between the actual generator output and the desired generator output greater than threshold difference) may be varied based on engine operating conditions in order to control an amount of exhaust flowing to the turbine via the blowdown valves. For example, in a four cylinder engine, each cylinder including one blowdown exhaust valve for delivering exhaust gases to the turbine, during a first engine operating condition, three blowdown valves may be deactivated while one blowdown valve may remain active; during a second condition, two blowdown valves may be deactivated while two blowdown valves remain active; during a third condition, one blowdown valve may be deactivated while three blowdown valves may remain active. The number of blowdown valves deactivated may be based on one or more of a rate of change of turbine speed, a difference between an actual generator output and a desired generator output greater than a threshold difference, and an engine speed/load condition.

In this way, by selectively deactivating the blowdown valves during conditions when the turbine speed is greater than the threshold speed, and/or when the generator output is greater than desired, the amount of exhaust blowdown energy delivered to the turbine may be reduced while the amount of scavenging energy delivered to an exhaust manifold may be increased without utilizing wastegate mechanisms. Consequently, manufacturing cost and packaging constraints associated with installing expensive and bulky wastegate systems may be reduced. Further, by utilizing valve deactivation and not utilizing wastegate to reduce energy to the turbine, an exhaust passage volume upstream of the turbine may be reduced which leads to improved utilization of blowdown energy may be achieved.

In one example, a method for an engine may comprise delivering exhaust from a first exhaust valve of a cylinder to an exhaust turbine via a first exhaust manifold, the turbine driving a generator; delivering exhaust from a second exhaust valve of the cylinder to an exhaust catalyst while bypassing the turbine via a second exhaust manifold; and selectively deactivating the first exhaust valve in response to a turbine speed greater than a threshold turbine speed. The method may further comprise, selectively deactivating the first exhaust valve in response to a generator output greater than a threshold output and selectively deactivating the first exhaust valve in response to a difference between an actual generator output and a desired generator output greater than a threshold difference, wherein the threshold turbine speed is based on a desired generator speed and the desired generator speed is based on an engine speed, an engine load, an amount of exhaust mass flow into the turbine via the first exhaust valve, and a battery state of charge. Further, a first exhaust valve opening timing of the first exhaust valve is advanced with respect to a second exhaust valve opening timing of the second exhaust valve; and a first exhaust valve closing timing of the first exhaust valve is advanced with respect to a second exhaust valve closing timing of the second exhaust valve. Further, the method may include determining a number of first exhaust valves to deactivate during the selective deactivation, wherein the number of first exhaust valves to deactivate is based on one or more of a rate of change of the turbine speed, a difference between an actual generator output and a desired generator output greater than a threshold difference, an engine speed, and an engine load. Still further, the method may include, deactivating the first exhaust valves on all the engine cylinders engine during the selective deactivation.

In some examples, in response to a turbine speed greater than a threshold speed, and/or an actual generator output greater than a desired output, the blowdown valve may be deactivated, and the timing and duration of the scavenging valve may be adjusted in order to limit the turbine speed and the generator output. For example, in addition to deactivating the blowdown valve, a timing of the scavenging valve may be advanced and/or a duration of the scavenging valve may be increased to reduce exhaust flow to the turbine.

Note that the example control and estimation routines included herein can be used with various engine and/or vehicle system configurations. The control methods and routines disclosed herein may be stored as executable instructions in non-transitory memory and carried out by executing the instructions via the controller in connection with the various sensors, actuators, etc., in that the system in combination carries out the example methods illustrated in the figures. The specific routines described herein may be carried out by one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system coupled with the various structural components illustrated herein.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an engine including an exhaust-driven turbine, the method comprising:
   determining engine operating conditions which comprise at least one of an actual turbine speed, an actual generator speed, and an actual generator output;
   in response to determining, with an engine controller, the actual turbine speed less than a threshold turbine speed,
      adjusting a first exhaust valve of a cylinder via a first actuator to deliver exhaust produced by combustion from the first exhaust valve of the cylinder to the exhaust-driven turbine via a first exhaust manifold;

wherein the exhaust-driven turbine drives a generator; and adjusting a second exhaust valve of the cylinder via a second actuator to deliver exhaust produced by combustion from the second exhaust valve of the cylinder to an exhaust catalyst while bypassing the exhaust-driven turbine via a second exhaust manifold; and in response to determining, with the engine controller, the actual turbine speed greater than or equal to the threshold turbine speed, selectively deactivating the first exhaust valve via the first actuator.

2. The method of claim 1, where the first exhaust valve is deactivated to a closed position, and further comprising:

selectively deactivating the first exhaust valve, in response to determining, with the engine controller, the actual generator output greater than a threshold output;

wherein the actual generator output includes one or more of a generator output voltage, a generator output current, or a generator output power.

3. The method of claim 1, further comprising:

determining, with the engine controller, a desired generator output;

determining, with the engine controller, a difference between the actual generator output and the desired generator output; and in response to determining, with the engine controller, the difference between the actual generator output and the desired generator output greater than a threshold difference, selectively deactivating the first exhaust valve.

4. The method of claim 1, further comprising:

determining, with the engine controller, the threshold turbine speed based on a desired generator speed.

5. The method of claim 4, wherein further comprising:

determining, with the engine controller, the desired generator speed based on an engine speed, an engine load, and an amount of exhaust mass flow being delivered into the exhaust-driven turbine via the first exhaust valve.

6. The method of claim 1, further comprising:

in response to the actual turbine speed less than the threshold turbine speed, advancing a first exhaust valve opening timing of the first exhaust valve with respect to a second exhaust valve opening timing of the second exhaust valve at end of a power stroke.

7. The method of claim 6, further comprising:

in response to the actual turbine speed less than the threshold turbine speed, advancing a first exhaust valve closing timing of the first exhaust valve is advanced with respect to a second exhaust valve closing timing of the second exhaust valve at end of an exhaust stroke.

8. The method of claim 1, further comprising:

in response to the actual turbine speed greater than the threshold turbine speed, selectively deactivating the first exhaust valve of a number of cylinders of the engine.

9. The method of claim 8, wherein further comprising:

deactivating the first exhaust valve of the number of the cylinders of the engine based on one or more of a rate of change of the turbine speed, a difference between the actual generator output and a desired generator output greater than a threshold difference, an engine speed, and an engine load.

10. The method of claim 1, further comprising:

in response to the actual turbine speed greater than the threshold turbine speed, deactivating the first exhaust valve of the cylinder.

11. A method of operating an engine including a first exhaust passage directly coupled to a turbine driving a generator and a second exhaust passage directly coupled to an exhaust catalyst, an outlet of the turbine coupled to the catalyst via a third exhaust passage, the method comprising:

determining engine operating conditions which comprise at least one of an actual turbine speed, an actual generator speed, and an actual generator output;

in response to determining, with an engine controller, the actual turbine speed less than a threshold turbine speed, flowing exhaust gas produced by combustion to the turbine by operating a first exhaust valve of all cylinders, the first exhaust valve in each of said all cylinders selectively allowing the exhaust gas flow from the each of said all cylinders to the first exhaust passage via a first exhaust manifold; and flowing exhaust gas produced by combustion to the catalyst by operating a second exhaust valve of said all cylinders, the second exhaust valve in the each of said all cylinders selectively allowing the exhaust gas flow from the each of said all cylinders to the second exhaust passage via a second exhaust manifold; and in response to determining, with the engine controller, the speed of the turbine at or above the threshold speed, selectively deactivating the first exhaust valve of a number of cylinders while maintaining the first exhaust valve of a remaining number of the cylinders active;

wherein the first exhaust valve of the each of said all cylinders is operated via a first actuator and the second exhaust valve of the each of said all cylinders is operated by a second actuator.

12. The method of claim 11, further comprising:

in response to the actual turbine speed being at or above the threshold speed, selectively deactivating the first exhaust valve of said all cylinders.

13. The method of claim 11, further comprising:

determining, with the controller, wherein the number of the cylinders based on one or more of a rate of change of the turbine speed, a difference between an actual generator output and a desired generator output greater than a threshold difference, an engine speed, and an engine load.

14. The method of claim 13, further comprising:

in response to determining, with the engine controller, the actual generator output greater than a threshold generator output, selectively deactivating the first exhaust valve of the number of the cylinders.

15. The method of claim 14, further comprising:

in response to determining, with the engine controller, a difference between an actual generator speed and a desired generator speed greater than a threshold generator speed, selectively deactivating the first exhaust valve of the number of the cylinders.

16. The method of claim 15, further comprising:

determining, with the engine controller, the desired generator speed based on an engine speed, an engine load, and an amount of exhaust mass flow being delivered into the turbine via the first exhaust valve.

17. The method of claim 13, further comprising:
in response to the actual turbine speed less than the threshold turbine speed, and the actual generator output less than the threshold generator output, advancing a timing of the first exhaust valve of said all cylinders with respect to a timing of the second exhaust valve of said all cylinders.

18. A system comprising:
an engine cylinder;
a first exhaust valve for delivering an initial portion of exhaust gas from the cylinder to a turbine-generator via a first exhaust passage;
a second exhaust valve for delivering a latter portion of the exhaust gas from the cylinder to an exhaust catalyst located downstream of the turbine-generator via a second exhaust passage separate from the first exhaust passage, an outlet of the turbine-generator coupled to the exhaust catalyst via a third passage;
a valve actuator configured to deactivate the first exhaust valve; and
a controller with computer readable instructions included on a non-transitory computer readable medium to execute of:
determining engine operating conditions which comprise at least one of an actual turbine speed, an actual generator speed, and an actual generator output; and
deactivating the first exhaust valve in response to the actual generator output greater than a threshold generator output.

19. The system of claim 18, further comprising:
deactivating the first exhaust valve in response to the actual turbine speed greater than a threshold turbine speed, and where the initial portion of the exhaust gas is delivered to the turbine-generator before the latter portion of the exhaust gas is delivered to the exhaust catalyst during a cylinder cycle.

20. The system of claim 19, wherein the desired generator output is based on a desired generator speed, the desired generator speed based on an engine speed, an engine load, and an amount of exhaust mass flow being delivered into the turbine-generator via the first exhaust valve.

* * * * *